(12) United States Patent
Haraszti et al.

(10) Patent No.: US 10,862,734 B2
(45) Date of Patent: *Dec. 8, 2020

(54) NETWORK MANAGEMENT SYSTEMS AND METHODS

(71) Applicant: Ciena Corporation, Hanover, MD (US)

(72) Inventors: Zsolt Haraszti, Santa Rosa, CA (US); Darren James Dowker, Petaluma, CA (US); Richard Sherman Lopez, San Anselmo, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,802

(22) Filed: Nov. 27, 2018

(65) Prior Publication Data
US 2019/0097868 A1 Mar. 28, 2019

Related U.S. Application Data

(63) Continuation of application No. 14/302,185, filed on Jun. 11, 2014, now Pat. No. 10,177,962.

(60) Provisional application No. 61/833,788, filed on Jun. 11, 2013.

(51) Int. Cl.
*H04L 12/24* (2006.01)
*H04L 12/26* (2006.01)

(52) U.S. Cl.
CPC .......... *H04L 41/0233* (2013.01); *H04L 41/00* (2013.01); *H04L 41/02* (2013.01); *H04L 41/022* (2013.01); *H04L 43/00* (2013.01); *H04L 43/04* (2013.01)

(58) Field of Classification Search
CPC ... H04L 41/0233; H04L 41/022; H04L 41/00; H04L 41/02; H04L 43/04; H04L 43/00
See application file for complete search history.

(56) References Cited

U.S. PATENT DOCUMENTS

| | | | | |
|---|---|---|---|---|
| 5,535,335 | A | * 7/1996 | Cox | G06F 11/3006 709/221 |
| 6,148,337 | A | 11/2000 | Estberg et al. | |
| 6,393,472 | B1 | * 5/2002 | Anerousis | H04L 41/0213 709/223 |
| 7,028,228 | B1 | 4/2006 | Lovy et al. | |
| 7,194,727 | B2 | * 3/2007 | Kaski | H04L 41/0233 717/104 |

(Continued)

*Primary Examiner* — Nam T Tran
(74) *Attorney, Agent, or Firm* — Clements Bernard Walker; Lawrence A. Baratta, Jr.; Christopher L. Bernard

(57) ABSTRACT

In a network management system communicatively coupled to a plurality of domains, each domain has a plurality of resources including physical resources and/or virtual resources executed on corresponding computing devices, each domain provides a plurality of services including one or more of computing services, storage services, network services, and combinations thereof via the plurality of resources, systems and methods include identifying a collection of the plurality of resources and/or the plurality of services as a fusion object; managing the fusion object via a set of Application Program Interfaces (APIs) to perform management of the collection as a single manageable entity; and updating the fusion object based on one or more of network topology changes in the plurality of domains, resource changes in the plurality of domains, and service changes in the plurality of domains.

18 Claims, 6 Drawing Sheets

(56) References Cited

U.S. PATENT DOCUMENTS

| | | |
|---|---|---|
| 7,860,024 B1 | 12/2010 | Greenberg et al. |
| 8,862,570 B1* | 10/2014 | Fiszman ............. H04L 41/0273 |
| | | 707/713 |
| 2002/0095500 A1 | 7/2002 | Schmidt |
| 2003/0214525 A1* | 11/2003 | Esfahany ................ H04L 41/12 |
| | | 715/700 |
| 2004/0031039 A1 | 2/2004 | Sarraf et al. |
| 2005/0071350 A1* | 3/2005 | Artale .................... G06Q 10/06 |
| 2006/0112175 A1* | 5/2006 | Sellers ................ H04L 41/0213 |
| | | 709/223 |
| 2006/0265353 A1 | 11/2006 | Garg et al. |
| 2008/0319857 A1 | 12/2008 | Dobbins et al. |
| 2009/0019104 A1 | 1/2009 | Justen et al. |
| 2010/0251123 A1 | 9/2010 | Nandagopal et al. |
| 2011/0029810 A1* | 2/2011 | Jaisinghani ............. H04L 41/12 |
| | | 714/4.1 |
| 2012/0011254 A1 | 1/2012 | Jamjoom et al. |
| 2012/0177370 A1 | 7/2012 | Berman |

\* cited by examiner

NETWORK MANAGEMENT SYSTEMS AND METHODS

CROSS-REFERENCE TO RELATED APPLICATION(S)

This application is a continuation of U.S. patent application Ser. No. 14/302,185, entitled "Network management systems and methods," filed Jun. 11, 2014, which claims the priority benefit of U.S. Provisional Application Ser. No. 61/833,788, entitled "Network management systems and methods," filed Jun. 11, 2013, the disclosure of each is incorporated by reference herein in its entirety.

TECHNICAL FIELD

The present disclosure relates to systems and methods that manage various systems and resources in a network environment.

BACKGROUND

Modern networks can be very complex. For example, large networks may span significant geographic distances and contain a large number of physical resources, virtual resources, sub-networks, domains, service providers, and the like. It can be difficult to manage large networks, particularly when the networks span multiple domains, multiple service providers, and multiple data center providers. Existing techniques often require multiple different network management systems to effectively manage the various systems and resources in such a large network.

The systems and methods described herein support the management of multiple network systems and resources using a single managed object

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
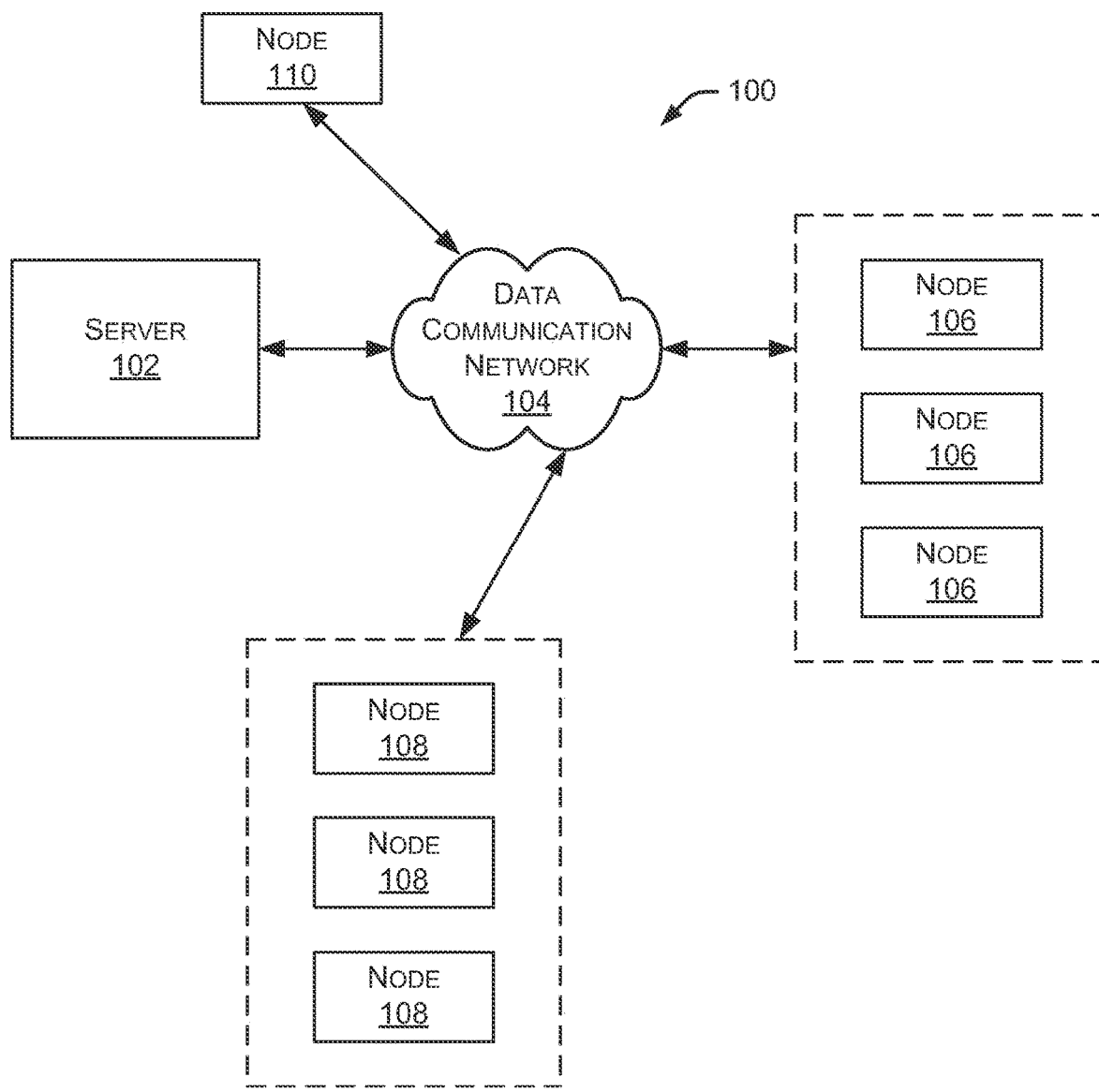
FIG. 1 is a block diagram depicting an environment within which an example embodiment may be implemented.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein are related to the creation, modification, and management of fusion objects. A fusion object is a collection of resources and services grouped together into a single manageable entity. Resources can represent physical resource such as servers or firewalls, or virtual resources such as virtual machines or virtual firewalls. A fusion object can span multiple domains, multiple service providers, and multiple data center providers. As discussed herein, a fusion object allows an entity (e.g., an enterprise customer, a service provider, a data center provider, and the like) to manage networking and non-networking resources as a single managed object. A fusion object can be sold as a service to another entity or used as an internal aggregated resource. Fusion objects can be recursive, meaning a fusion object can contain other fusion object(s) as resources. An example set of Application Program Interfaces (APIs) for the management of fusion objects is discussed herein.

As used herein, a domain refers to an autonomously managed service provider that offers, for example, networking and/or cloud services. Additionally, a domain may represent a set of resources (e.g., a network or a data center) managed by a single entity. NaaS (Network as a Service) refers to virtualized networks that can be sold as a service to end users. The virtualized network appears to the end user as a dedicated network. IaaS (Infrastructure as a Service) refers to a cloud service that offers computing services (e.g., physical or virtual machines), storage services, network services, and/or other resources.

FIG. 1 is a block diagram depicting an environment 100 within which an example embodiment may be implemented. Environment 100 may include one or more servers 102 that may each be embodied as one or more server computers each including one or more processors that are in data communication with one another. Server 102 may be in data communication with one or more nodes 106 at first location and one or more nodes 108 that may be at a different location. Individual nodes 106 and 108 may each be a node of a network and the multiple nodes at a particular location may be represented as a cluster, which is also defined as a node of a network. Additionally, environment 100 may include any number of other nodes 110. Nodes 106, 108, and 110 may be embodied as any network-connected computer device such as a desktop computer, laptop computer, tablet computer, smartphone, or the like. Server 102 and nodes 106, 108, and 110 are coupled to a data communication network 104, thereby allowing the server, nodes, and other devices and systems to communicate with one another. Data communication network 104 may be embodied as a peer-to-peer connection between devices, a connection through a local area network (LAN), WiFi network, the Internet, or any other communication medium or system.

Environment 100 represents one example of a networked system that may be managed according to systems and methods described herein. The number of clusters of nodes 106, 108, servers 102, data communication networks 104, and the arrangement and connections between these components may have any arbitrary configuration and may be organized according to any principle for designing such networks. As noted herein, large networks may be managed according to the described systems and methods.

Figure 2:
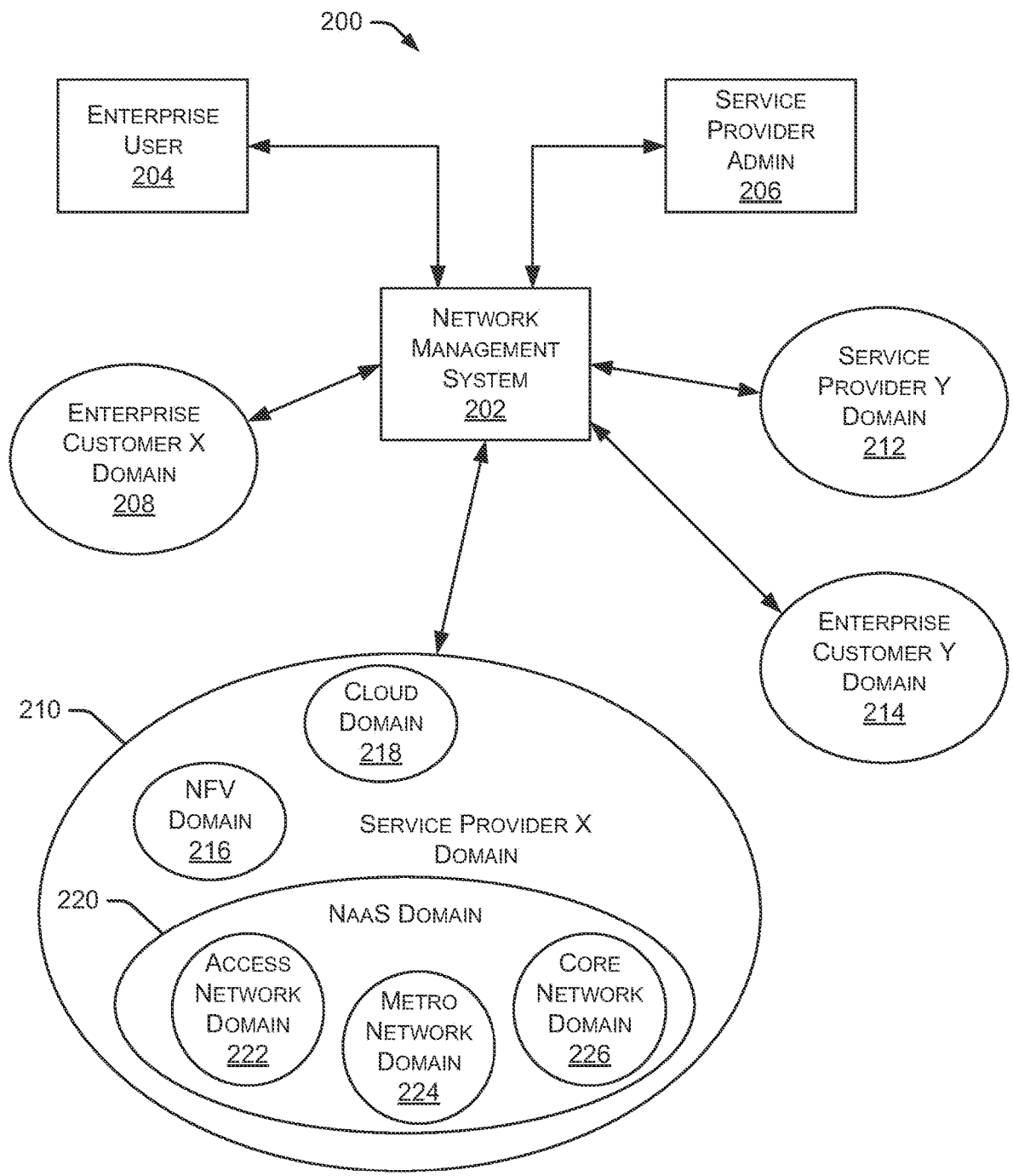
FIG. 2 is a block diagram depicting an example collection of resources and services managed by a single network management system.

FIG. 2 is a block diagram depicting an example collection of resources and services 200 managed by a single network management system 202. Network management system 202 is accessible by an enterprise user 204 and a service provider administrator 206. For example, enterprise user 204 and/or service provider administrator 206 may access network management system 202 to manage one or more resources, services or systems shown in FIG. 2. In alternate embodiments, network management system 202 is accessible by any number of different users, administrators, systems, devices, and the like. In some embodiments, network management system 202 manages multiple fusion objects, as discussed herein.

Network management system 202 interfaces to an enterprise customer X domain 208, a service provider X domain 210, a service provider Y domain 212, and an enterprise customer Y domain 214. Specific details are shown regarding service provider X domain 210. The other domains 208, 212, and 214 may contain similar details. Service provider X domain 210 includes an NFV (Network Functions Visualization) domain 216, a cloud domain 218, and a NaaS domain 220. NFV is a network architecture that uses virtualization techniques to virtualize various network functions. Cloud domain 218 includes, for example, one or more cloud-based services or resources. NaaS domain 220 includes an access network domain 222, a metro network domain 224, and a core network domain 226. Alternate embodiments of NaaS domain 220 may include any number of different domains offering any type of domain-related services.

As mentioned above, some embodiments of network management system 202 manage one or more fusion objects. These fusion objects allow enterprise user 204, service provider administrator 206 or other users to manage the domains, resources, networks, and sub-networks shown in FIG. 2. Rather than managing each of the domains separately, the fusion objects provide a single point of management for all resources and services 200.

Figure 3A:
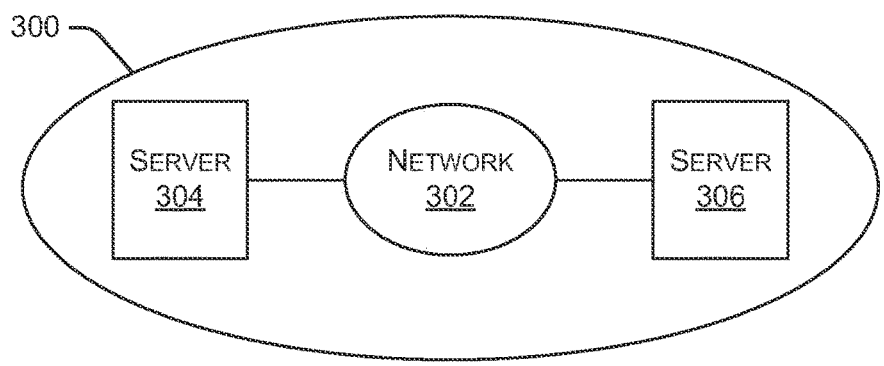
FIGS. 3A-3C depict example collections of resources and services grouped together into individual fusion objects.
Figure 3B:
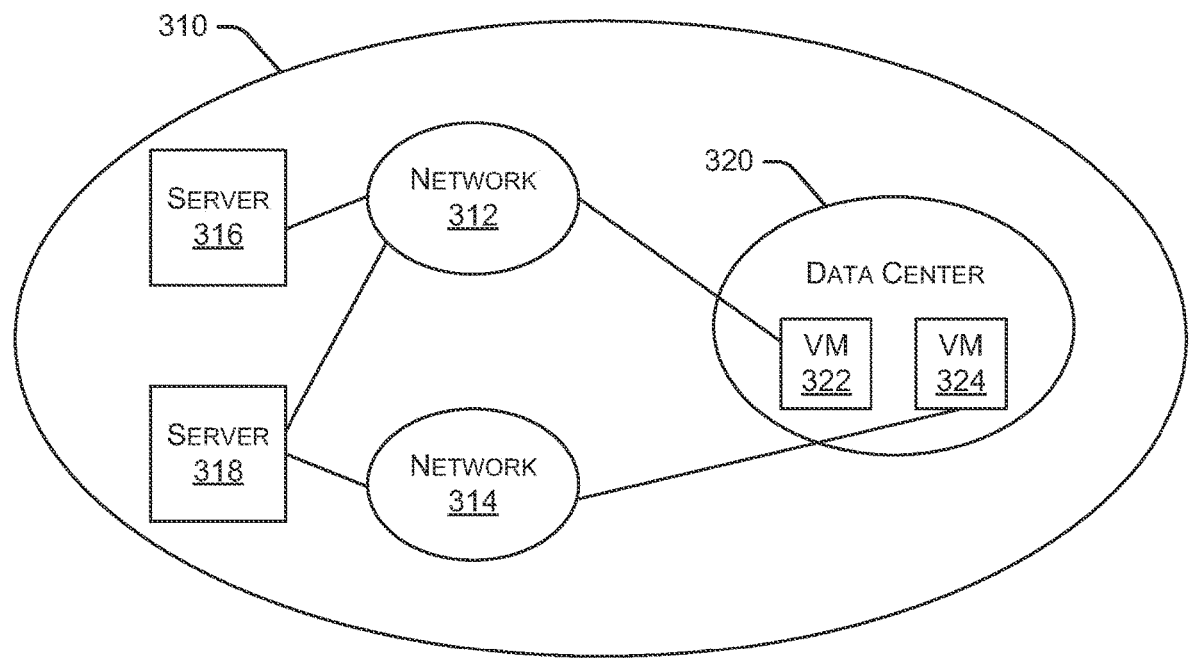
Figure 3C:
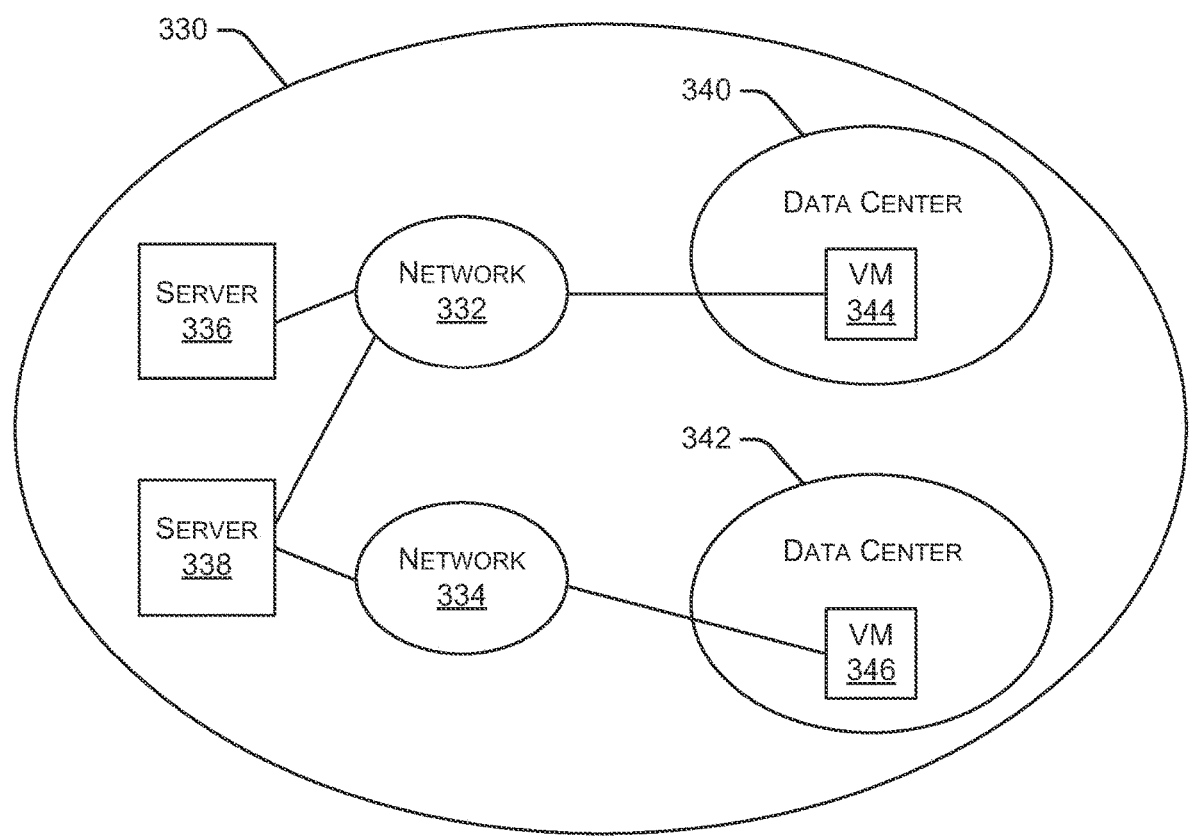

FIGS. 3A-3C depict example collections of resources and services grouped together into individual fusion objects. As discussed herein, a fusion object is a collection of resources and services grouped together into a single manageable entity. Resources may include physical resources (such as servers or firewalls) or virtual services (such as virtual machines or virtual firewalls). A fusion object can span, for example, multiple domains, multiple service providers, and multiple data center providers.

FIG. 3A illustrates a fusion object 300 capable of managing a network 302 coupled to two servers 304 and 306. Fusion object 300 provides a single manageable entity that is accessed to manage network 302 and servers 304, 306.

FIG. 3B illustrates a fusion object 310 capable of managing two networks 312 and 314, two servers 316 and 318, and a data center 320. Data center 320 includes two virtual machines (VMs) 322 and 324. As shown in FIG. 3B, virtual machine 322 is accessible through network 312 and virtual machine 324 is accessible through network 314.

FIG. 3C illustrates a fusion object 330 capable of managing two networks 332, 334, two servers 336 and 338, and two data centers 340 and 342. Data center 340 includes a virtual machine (VM) 344, and data center 342 includes a virtual machine (VM) 346. As shown in FIG. 3C, virtual machine 344 is accessible through network 332 and virtual machine 346 is accessible through network 334.

As shown in FIGS. 3A-3C, fusion objects can group any combination of physical and virtual resources into a single managed entity.

Figure 4:
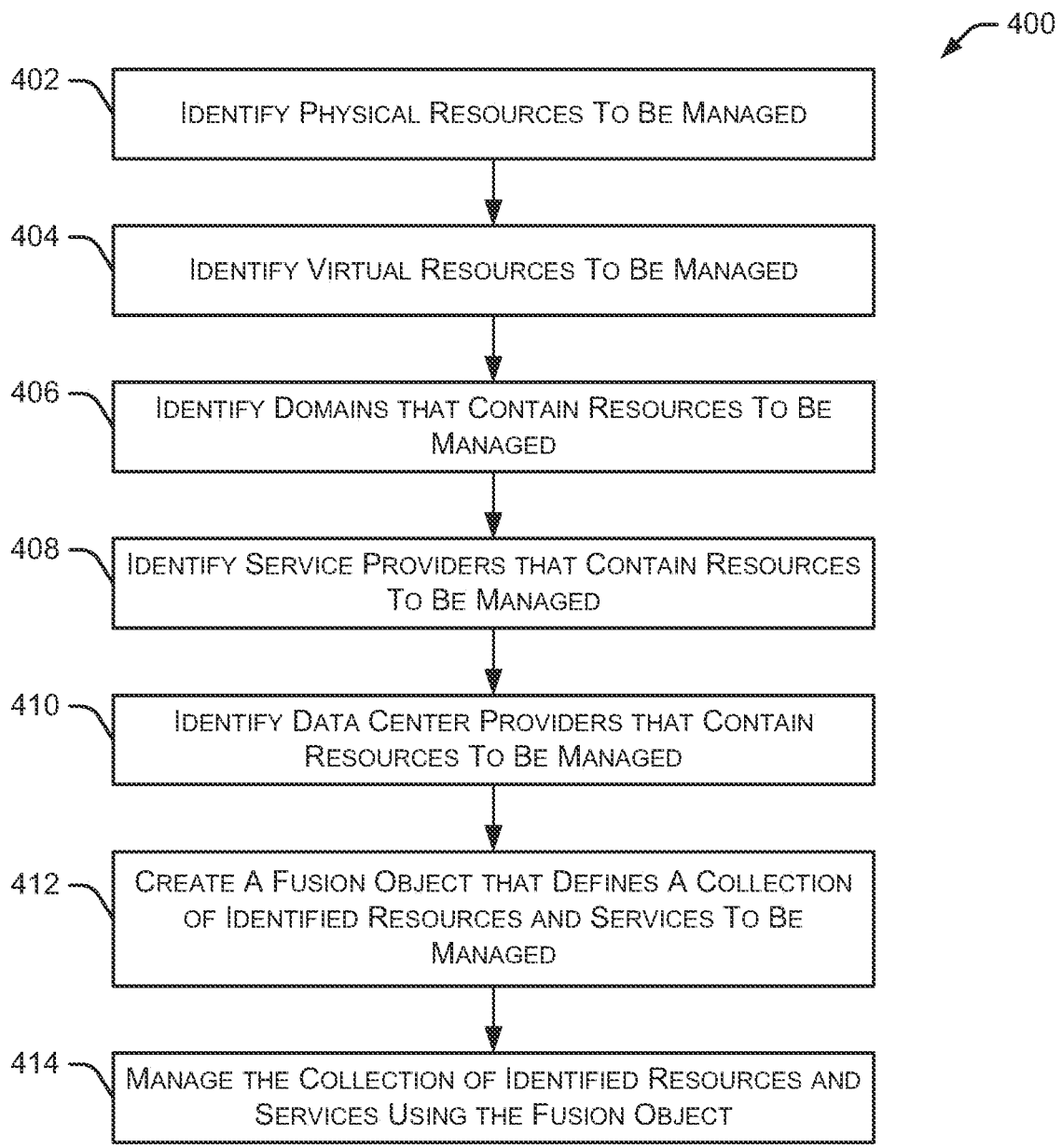
FIG. 4 is a flow diagram depicting an embodiment of a method for managing multiple resources, domains, and service providers in a network environment.

FIG. 4 is a flow diagram depicting an embodiment of a method 400 for managing multiple resources, domains, and service providers in a network environment. In some embodiments, at least a portion of method 400 is performed by server 102 (FIG. 1). Initially, method 400 identifies physical resources to be managed with a particular fusion object at 402. These physical resources may include networked resources and/or non-networked resources. Method 400 then identifies virtual resources to be managed by the fusion object at 404. Virtual resources include, for example, virtual machines and virtual firewalls.

Method 400 continues by identifying domains that contain resources to be managed by the fusion object at 406. Service providers that contain resources to be managed by the fusion object are identified at 408. Additionally, method 400 identifies data center providers that contain resources to be managed by the fusion object at 410. A fusion object is created at 412 that defines a collection of identified resources and services to be managed. After the fusion object is created, the collection of identified resources and services are managed using the fusion object at 414. The fusion object uses various resource objects and management interface features to manage the collection of identified resources and services.

In a particular embodiment, a fusion object contains multiple identifiers, links, and/or other information that identifies any number of resources or services managed by the fusion object. For example, a particular fusion object may contain:

Data Center 101, Virtual Machine 10 (which identifies a particular data center and a virtual machine within the data center).

E-Line Service—EVPL VLAN 1001 (which identifies a particular service and a VLAN (Virtual Local Area Network) associated with the service).

Data Center 201, Virtual Machine 20 (which identifies a particular data center and a virtual machine within the data center).

As networks change, corresponding fusion objects may be updated or modified to reflect those changes. For example, network topology changes, resource changes, and service changes may necessitate changes in the fusion objects used to manage those networks, resources, and services. Additionally, changes in management requirements or network management preferences by prompt changes to one or more fusion objects to properly implement the changed management requirements or preferences. Depending on the resources and services being managed by a fusion object, a user may define a set of objects to be included in the fusion object.

Figure 5:
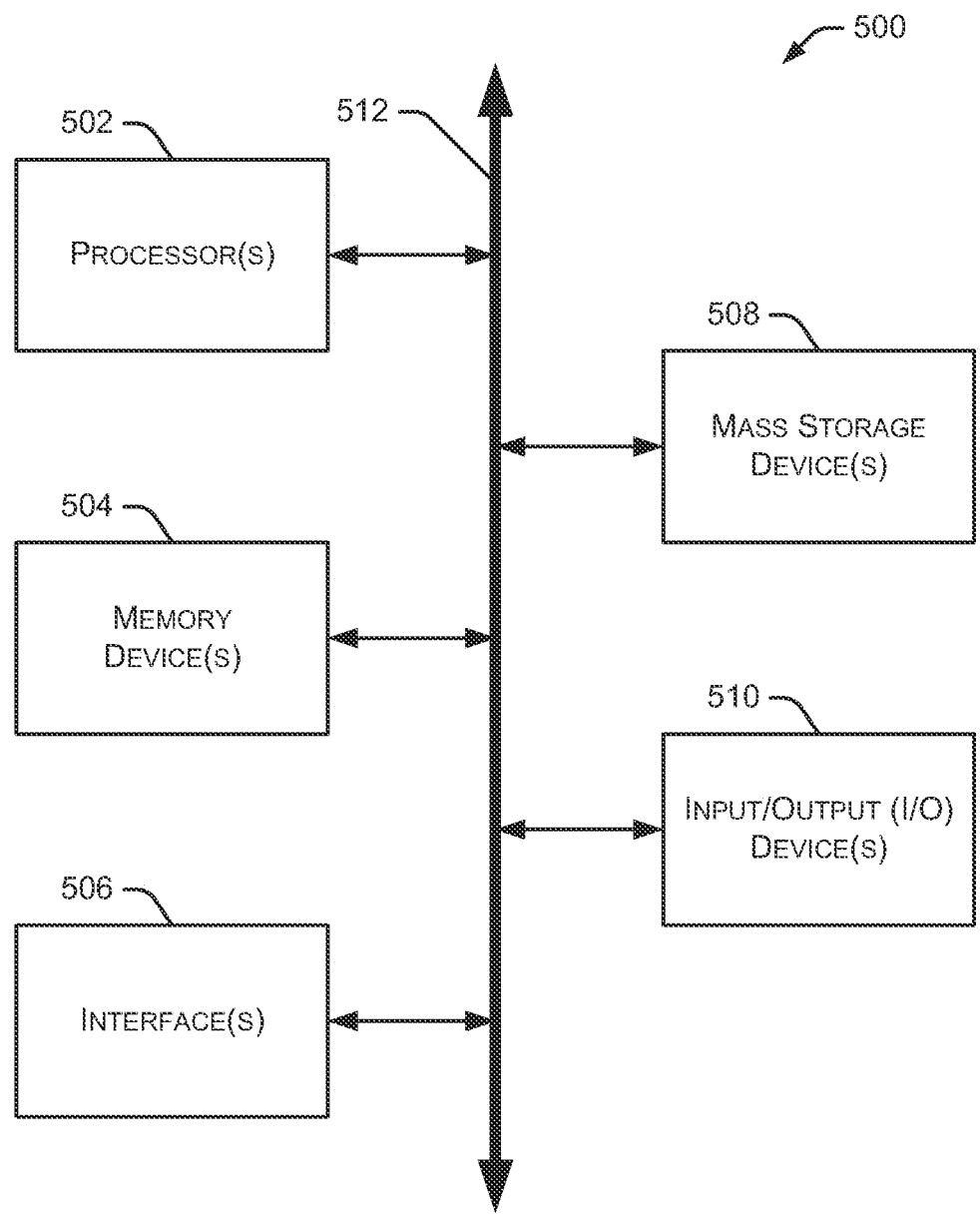
FIG. 5 is a block diagram depicting an example computing device.

FIG. 5 is a block diagram depicting an example computing device 500. Computing device 500 may perform, for example, tasks and operations discussed herein with respect to determining network data to display, generating network maps, implementing various algorithms, and the like. Computing device 500 may be used to perform various procedures, such as those discussed herein. Computing device 500 can function as a server, a client or any other computing entity. Computing device 500 can be any of a wide variety of computing devices, such as a desktop computer, a notebook computer, a server computer, a handheld computer, a tablet, a mobile device, a set-top box, a portable entertainment device, and the like.

Computing device 500 includes one or more processor(s) 502, one or more memory device(s) 504, one or more interface(s) 506, one or more mass storage device(s) 508, and one or more Input/Output (I/O) device(s) 510, all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM)) and/or nonvolatile memory (e.g., read-only memory (ROM)). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. Various drives may also be included in mass storage device(s) 508 to enable reading from and/or writing to the various computer-readable media. Mass storage device(s) 508 include removable media and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Interface(s) 506 include various interfaces that allow computing device 500 to interact with other systems, devices, or computing environments. Example interface(s) 506 include any number of different network interfaces, such as interfaces to local area networks (LANs), wide area networks (WANs), wireless networks, and the Internet.

Bus 512 allows processor(s) 502, memory device(s) 504, interface(s) 506, mass storage device(s) 508, and I/O device(s) 510 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The following example APIs are used to implement the systems and methods discussed herein.

Alarms

| Method | REST URI* | Description |
|---|---|---|
| list | GET /alarms | List all available alarms. All alarms. |
| | GET /fusions/{fusion}/alarms | List all available alarms. Alarms in given fusion. |
| get | GET /alarms/{alarm} | Get information on a given alarm. |

*Relative to the base URI: http://192.168.100.136:8090/api/v1

Assets

Represents all infrastructure assets accessible by a given tenant.

| Method | REST URI* | Description |
|---|---|---|
| list | GET /assets | List all assets available. All assets. |
| | GET /fusions/{fusion}/assets | List all assets available. Assets in given fusion. |

*Relative to the base URI: http://192.168.100.136:8090/api/v1

Bandwidth Profiles

| Method | REST URI* | Description |
|---|---|---|
| list | GET /bwprofiles | List all available bandwidth profiles. All bandwidth profiles |
| get | GET /bwprofiles/{bwprofile} | Get information on a given bandwidth profile. |

*Relative to the base URI: http://192.168.100.136:8090/api/v1

Class Profiles

| Method | REST URI* | Description |
|---|---|---|
| list | GET /classprofiles | List all available service class profiles. All service class profiles |
| get | GET /classprofiles/{classprofile} | Get information on a given service class profile. |

*Relative to the base URI: http://192.168.100.136:8090/api/v1

Domain Provider

| Method | REST URI* | Description |
|---|---|---|
| list | GET /domains | List all domains available. |
| get | GET /domains/{domain} | Get information on a given domain. |

*Relative to the base URI: http://192.168.100.136:8090/api/v1

Domain Accounts

| Method | REST URI* | Description |
|---|---|---|
| list | GET /domainaccounts | List all available domain accounts. |
| get | GET /domainaccounts/{domainaccount} | Get information on a given domain account. |

*Relative to the base URI: http://192.168.100.136:8090/api/v1

Connections

| Method | REST URI* | Description |
|---|---|---|
| list | GET /connections | List all available connections. All connections. |
| | GET /fusions/{fusion}/connections | List all available connections. Connections in given fusion. |
| get | GET /connections/{connection} | Get information on a given connection. |

*Relative to the base URI: http://192.168.100.136:8090/api/v1

Dependencies

| Method | REST URI* | Description |
|---|---|---|
| list | GET /connections/{connection}/dependencies | List dependencies of a given asset Dependencies of a connection |
| | GET /endpoints/{endpoint}/dependencies | List dependencies of a given asset Dependencies of an endpoint |
| | GET /links/{link}/dependencies | List dependencies of a given asset Dependencies of a link |
| | GET /networks/{network}/dependencies | List dependencies of a given asset Dependencies of a network |
| | GET /ports/{port}/dependencies | List dependencies of a given asset Dependencies of a port |
| | GET /servers/{server}/dependencies | List dependencies of a given asset Dependencies of a server |
| | GET /vms/{vm}/dependencies | List dependencies of a given asset Dependencies of a VM |

*Relative to the base URI: http://192.168.100.136:8090/api/v1

Dependents

| Method | REST URI* | Description |
|---|---|---|
| list | GET /connections/{connection}/dependents | List dependents of a given asset Dependents of a connection |
| | GET /endpoints/{endpoint}/dependents | List dependents of a given asset Dependents of an endpoint |
| | GET /links/{link}/dependents | List dependents of a given asset Dependents of a link |
| | GET /networks/{network}/dependents | List dependents of a given asset Dependents of a network |

-continued

| Method | REST URI* | Description |
|---|---|---|
| | GET /ports/{port}/dependents | List dependents of a given asset Dependents of a port |
| | GET /servers/{server}/dependents | List dependents of a given asset Dependents of a server |
| | GET /vms/{vm}/dependents | List dependents of a given asset Dependents of a VM |

*Relative to the base URI: http://192.168.100.136:8090/api/v1

Endpoints

| Method | REST URI* | Description |
|---|---|---|
| list | GET /endpoints | List all endpoints. All endpoints. |
| | GET /fusions/{fusion}/endpoints | List all endpoints. Endpoints in given fusion. |
| get | GET /endpoints/{endpoint} | Get information on a given endpoint. |
| update | PUT /endpoints/{endpoint} | Modify endpoint information |
| Statistics | GET /endpoints/{endpoint}/statistics | Get utilization statistics on endpoint. |

*Relative to the base URI: http://192.168.100.136:8090/api/v1

Fusions

Represents a collection of resources organized by their purpose

| Method | REST URI* | Description |
|---|---|---|
| list | GET /fusions | List all fusions available. |
| get | GET /fusions/{fusion} | Get information on a given fusion. |

*Relative to the base URI: http://192.168.100.136:8090/api/v1

Layers

| Method | REST URI* | Description |
|---|---|---|
| list | GET /layers | List all service layers. All service layers. |
| get | GET /layers/{layers} | Get information on a given service layer. |

*Relative to the base URI: http://192.168.100.136:8090/api/v1

Links

| Method | REST URI* | Description |
|---|---|---|
| list | GET /links | List all available links. All links. |
| | GET /fusions/{fusion}/links | List all available links. Links in given fusion. |
| get | GET /links/{link} | Get information on a given link. |

*Relative to the base URI: http://192.168.100.136:8090/api/v1

Networks

| Method | REST URI* | Description |
|---|---|---|
| list | GET /networks | List all networks. All networks. |
| | GET /fusions/{fusion}/networks | List all networks. Networks in given fusion. |
| get | GET /networks/{network} | Get information on a given network. |
| attachments | GET /networks/{network}/attachments | List assets attached to network Attachment of network |

*Relative to the base URI: http://192.168.100.136:8090/api/v1

Performance Profiles

| Method | REST URI* | Description |
|---|---|---|
| list | GET /perfprofiles | List all available performance profiles. All performance profiles. |
| get | GET /perfprofiles/{perfprofile} | Get information on a given performance profile. |

*Relative to the base URI: http://192.168.100.136:8090/api/v1

Ports

| Method | REST URI* | Description |
|---|---|---|
| list | GET /ports | List all available ports. All ports. |
| | GET /fusions/{fusion}/ports | List all available ports. Ports in given fusion. |
| get | GET /ports/{port} | Get information on a given port. |

*Relative to the base URI: http://192.168.100.136:8090/api/v1

Port Groups

| Method | REST URI* | Description |
|---|---|---|
| list | GET /portgroups | List all available port groups. All port groups. |
| | GET /fusions/{fusion}/portgroups | List all available port groups. Port groups in given fusion. |
| get | GET /portgroups/{portgroup} | Get information on a given port group. |

*Relative to the base URI: http://192.168.100.136:8090/api/v1

Servers

| Method | REST URI* | Description |
|---|---|---|
| list | GET /servers | List all available servers. All servers. |
| | GET /fusions/{fusion}/servers | List all available servers. Servers in given fusion. |
| get | GET /servers/{server} | Get information on a given server. |

*Relative to the base URI: http://192.168.100.136:8090/api/v1

Subcomponents
Subcomponents of an object

| Method | REST URI* | Description |
|---|---|---|
| list | GET /connections/{connection}/subcomponents | List subcomponents of a given asset Subcomponents of a connection |
| | GET /endpoints/{endpoint}/subcomponents | List subcomponents of a given asset Subcomponents of an endpoint |
| | GET /links/{link}/subcomponents | List subcomponents of a given asset Subcomponents of a link |
| | GET /networks/{network}/subcomponents | List subcomponents of a given asset Subcomponents of a network |
| | GET /ports/{port}/subcomponents | List subcomponents of a given asset Subcomponents of a port |
| | GET /servers/{server}/subcomponents | List subcomponents of a given asset Subcomponents of a server |
| | GET /vms/{vm}/subcomponents | List subcomponents of a given asset Subcomponents of a VM |

*Relative to the base URI: http://192.168.100.136:8090/api/v1

Tenants

| Method | REST URI* | Description |
|---|---|---|
| list | GET /tenants | List all available tenants. All tenants. |
| get | GET /tenants/{tenant} | Get information on a given tenant. |

*Relative to the base URI: http://192.168.100.136:8090/api/v1

Virtual Machines

| Method | REST URI* | Description |
|---|---|---|
| list | GET /vms | List all available VMs. All VMs. |
| | GET /fusions/{fusion}/vms | List all available VMs. VMs in given fusion. |
| get | GET /vms/{vms} | Get information on a given VM. |
| delete | DELETE /vms/{vm} | Delete a given VM. |
| Create | POST /fusions/{fusion}/vms | |

*Relative to the base URI: http://192.168.100.136:8090/api/v1

What is claimed is:

1. A method comprising:

in a network management system which is a computing device communicatively coupled to a plurality of domains, wherein each domain has a plurality of resources including physical resources and/or virtual resources executed on corresponding computing devices, wherein each domain provides a plurality of services including one or more of computing services, storage services, network services, and combinations thereof via the plurality of resources, identifying a collection of the plurality of resources and/or the plurality of services, spanning across multiple domains, multiple service providers, and multiple data centers, as a fusion object;

managing the fusion object via a set of Application Program Interfaces (APIs) to perform management of the collection of the plurality of resources and/or the plurality of services, spanning across the multiple domains, the multiple service providers, and multiple data centers, as a single manageable entity, wherein the managing the fusion object is via changes, provided by users and administrators, to the fusion object that identifies the collection of the plurality of resources and/or the plurality of services that span across the multiple domains, the multiple service providers, and the multiple data centers; and updating the fusion object based on one or more of network topology changes in the plurality of domains, resource changes in the plurality of domains, and service changes in the plurality of domains.

2. The method of claim 1, wherein the fusion object includes identifiers, links, and/or information that identifies the collection of the plurality of resources and/or the plurality of services.

3. The method of claim 1, wherein the collection of the plurality of resources and/or the plurality of services includes at least one data center, at least one node or virtual machine in the data center, and a service connected to the least one node or virtual machine.

4. The method of claim 1, wherein the plurality of resources include servers, nodes, firewalls, virtual machines, and virtual resources.

5. The method of claim 1, wherein the fusion object manages at least one network resource and at least one non-network resource which is either a compute resource or storage resource.

6. The method of claim 1, wherein the fusion object includes a second fusion object in a recursive manner.

7. The method of claim 1, wherein the set of APIs includes routines associated with one or more of alarms, assets, bandwidth profiles, class profiles, domain providers, domain accounts, connections, dependencies, dependents, endpoints, fusions, layers, links, networks, performance profiles, ports, port groups, servers, subcomponents, tenants, and virtual machines.

8. A network management system comprising:

one or more processors communicatively coupled to a plurality of domains, wherein each domain has a plurality of resources including physical resources and/or virtual resources executed on corresponding computing devices, wherein each domain provides a plurality of services including one or more of computing services, storage services, network services, and combinations thereof via the plurality of resources;

memory having one or more executable instructions configured to cause the processor to identify a collection of the plurality of resources and/or the plurality of services, spanning across multiple domains, multiple service providers, and multiple data centers, as a fusion object;

manage the fusion object via a set of Application Program Interfaces (APIs) to perform management of the collection of the plurality of resources and/or the plurality of services, spanning across the multiple domains, the multiple service providers, and the multiple data centers, as a single manageable entity, wherein the managing the fusion object is via changes, provided by users and administrators, to the fusion object that identifies the collection of the plurality of resources and/or the plurality of services that span across the multiple domains, the multiple service providers, the multiple data centers; and update the fusion object based on one or more of network topology changes in the plurality of domains, resource changes in the plurality of domains, and service changes in the plurality of domains.

9. The network management system of claim 8, wherein the fusion object is managed through changes to the fusion object which in turn causes corresponding changes to the collection of the plurality of resources and/or the plurality of services.

10. The network management system of claim 8, wherein the fusion object includes identifiers, links, and/or information that identifies the collection of the plurality of resources and/or the plurality of services.

11. The network management system of claim 8, wherein the collection of the plurality of resources and/or the plurality of services includes at least one data center, at least one node or virtual machine in the data center, and a service connected to the least one node or virtual machine.

12. The network management system of claim 8, wherein the plurality of resources include servers, nodes, firewalls, virtual machines, and virtual resources.

13. The network management system of claim 8, wherein the fusion object manages at least one network resource and at least one non-network resource which is either a compute resource or storage resource.

14. The network management system of claim 8, wherein the fusion object includes a second fusion object in a recursive manner.

15. A non-transitory computer-readable medium for storing computer program code that enables one or more processing devices to:

identify a collection of a plurality of resources and/or a plurality of services, spanning across multiple domains, multiple service providers, and multiple data centers, as a fusion object, wherein the computer program code is executable in a network management system which is a computing device communicatively coupled to a plurality of domains, wherein each domain has a plurality of resources including physical resources and/or virtual resources executed on corresponding computing devices, wherein each domain provides a plurality of services including one or more of computing services, storage services, network services, and combinations thereof via the plurality of resources;

manage the fusion object via a set of Application Program Interfaces (APIs) to perform management of the collection of the plurality of resources and/or the plurality of services, spanning across the multiple domains, the multiple service providers, and the multiple data centers, as a single manageable entity, wherein the managing the fusion object is via changes, provided by users and administrators, to the fusion object that identifies the collection of the plurality of resources and/or the plurality of services that span across the multiple domains, the multiple service providers, and the multiple data centers; and update the fusion object based on one or more of network topology changes in the plurality of domains, resource changes in the plurality of domains, and service changes in the plurality of domains.

16. The non-transitory computer-readable medium of claim 15, wherein the computer program code further enables the one or more processing devices to manage the fusion object by changing the fusion object which in turn causes corresponding changes to the collection of the plurality of resources and/or the plurality of services.

17. The non-transitory computer-readable medium of claim 15, wherein the fusion object includes identifiers, links, and/or information that identifies the collection of the plurality of resources and/or the plurality of services.

18. The non-transitory computer-readable medium of claim 15, wherein the collection of the plurality of resources and/or the plurality of services includes at least one data center, at least one node or virtual machine in the data center, and a service connected to the least one node or virtual machine.

* * * * *